United States Patent [19]
Quirk

[11] Patent Number: 5,674,038
[45] Date of Patent: Oct. 7, 1997

[54] ROUND BALE HAY HANDLING MACHINE

[76] Inventor: George E. Quirk, Rte. 1, Box 49, Washington, La. 70589

[21] Appl. No.: 682,156

[22] Filed: Jul. 17, 1996

[51] Int. Cl.⁶ ............................................. B60F 1/24
[52] U.S. Cl. .......................... 414/124.5; 298/18; 414/470
[58] Field of Search ................ 298/17.5, 18; 414/24.5, 414/470

[56] References Cited

U.S. PATENT DOCUMENTS 4,092,050  5/1978  Sobeck ........................ 414/24.5 X
4,580,843  4/1986  Lund ........................... 414/24.5 X
5,277,537  1/1994  Druse, Sr. .................... 414/24.5 X Primary Examiner—Karen B. Merritt
Assistant Examiner—Janice L. Krizek
Attorney, Agent, or Firm—John D. Jeter

[57] ABSTRACT

A bale carrier for mounting on a vehicle to carry round bales side-by-side, axes in the direction of vehicle travel, with a tilt cradle for each bale, arranged to dump the supported bales individually over the vehicle side, and a central longitudinal fence to separate bales. Independent latches secure each cradle to prevent dumping and an individual safety stay for each cradle prevents dumping until the stay is manually disabled.

13 Claims, 3 Drawing Sheets

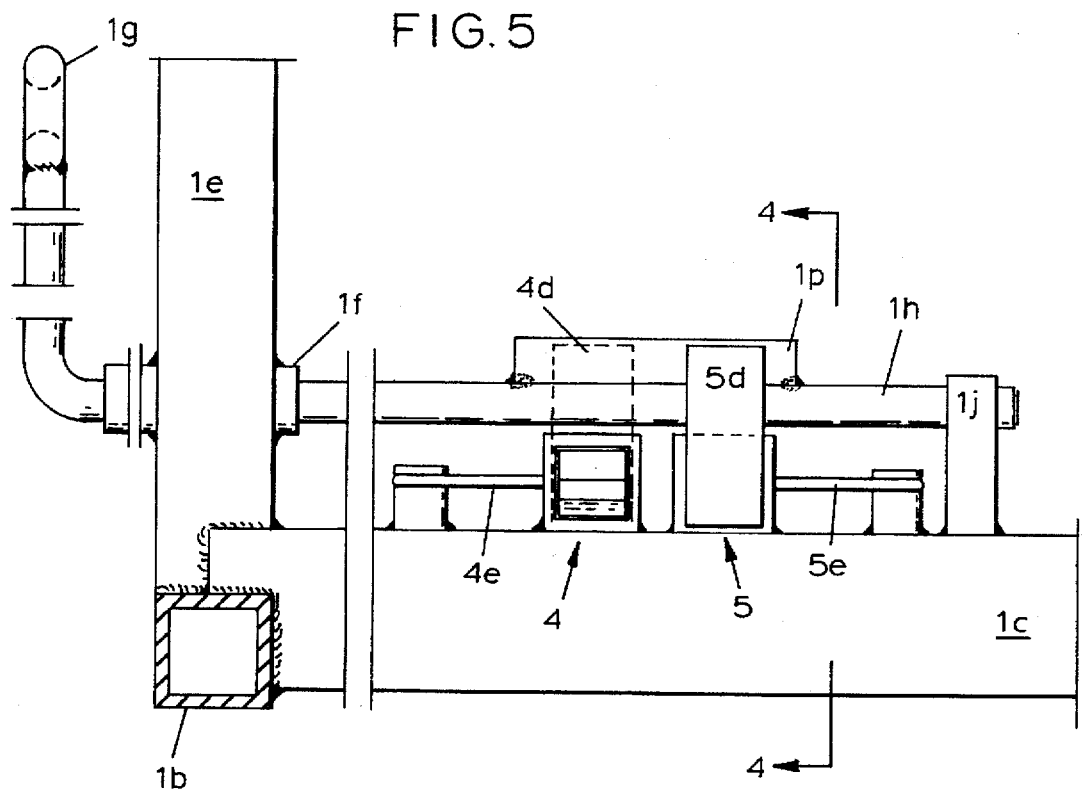

ROUND BALE HAY HANDLING MACHINE

This invention pertains to a machine for use on a prepared conveyance for hauling and dumping round bales of hay and the like. More particularly the machine provides for supporting round bales on opposed cradles that pivot by gravity forces to dump bales when manually released from a secured position.

BACKGROUND OF THE INVENTION

Early limits on available agricultural hauling and handling machinery dictated that bale sizes and shapes be subject to manual manipulation of individual bales with weathering ability a secondary concern. Square bales bound by baling wire evolved and the baling machines and those available machines for hay hauling and handling assumed a traditional shape. Early farm machines simply added mechanization to what could be done manually. Those machines took on many forms and applied to lifting from the ground, loading on conveyances, unloading and even stacking to considerable heights. Square bales did nothing to shed water and in fact wicked water into the interior and spoiled the product.

Round bales evolved to produce natural packages with a thatch like outer jacket that shed water and any wicking effect respected gravity and served to preserve the interior. They did, however, virtually defy handling manually to any appreciable extent. Mechanization of handling was practically a requirement. The first result was a fork lift device usually mounted on a farm tractor with the usual forks replaced by a single spear. The spears were fitted later to two wheeled trailers and the like to carry out distant transport. Single bale handling machines were far from an ideal answer to mass handling of hay.

The ordinary fork lift sufficed to load round bales on large trucks and trailers. Securing the loads was an individual contrivance matter with some serious problems.

Massive machines evolved and took on many structural forms with wide variance on the manner of approaching the individual bale for assembly of a secured load. Automatic dumping was added. Some special purpose machines were hydraulic and required little of the operator. Special agricultural machines of large and complex construction can be quite costly and however efficient they may be they produce an unacceptable economic burden on the usual, even large, farming operations.

The usual large farm is necessarily equipped with large tractor and trucking capabilities quite capable of handling individual bales and even rather large loads. Ideally, such large machines are adaptable to general purpose activity with easy hitching and mounting conveniences. Such costly equipment is preferably retained in the quick change status rather than being committed to special purposes such as hay handling alone.

It is therefore an object of this invention to provide a machine that can handle round bales in pairs and of such construction that it can be mounted in multiples end to end on the available platform to compile the handling capacity required for the task.

It is a further object to provide the hay handling machine that can be loaded with available lifting contrivances and to dump the bales individually without dependence upon the conveyance's hydraulic or power take off provisions.

It is yet another object of the invention to provide load securing and safety provisions with enough manual manipulation required to prevent accidental dumping of the bales individually or collectively.

These and other objects, advantages, and features of this invention will be apparent to those skilled in the art from a consideration of this specification, including the attached claims and appended drawings.

SUMMARY

A generally rectangular base frame supports two round hay bales side-by-side with their axes parallel. Two cradles are situated to hold one round bale each. The cradles are mounted to pivot between haul and dump positions on longitudinal pivot bars mounted atop the base. The frame has a central longitudinal spine with a vertical fence to separate the bales and a transverse beam at each end. Parallel to and some lateral distance from each side of the fence a pivot bar is attached, preferably, to the top of the transverse beams. Each cradle has tilt beams parallel to but not directly over each transverse beam with bearing tubes on the bottom to receive the pivot bar. The tilt beams are joined at the ends by an inboard longitudinal beam near and parallel to the spine and by an outboard longitudinal beam at the opposite ends. Both longitudinal beams rest atop the tilt beams. The cradles can tilt inboard to the haul position in which the inboard longitudinal beams rest atop the transverse beams and can tilt to the dump position in which the outboard longitudinal beams rest atop the transverse beams. With base and cradles level, the cradles are above the base, separated by at least the diameter of the pivot bar. With cradles in the haul position the bale rests against the fence. In the dump position the bale rolls over the outboard beam.

The spine supports a latch for each cradle with latch bolts that extend from the latch body to engage the top of the related inboard beam. The center of gravity of the bale load is outboard of the pivot bar axis and the cradle would tilt to the dump position if not latched. The latches are, preferably, shot bolt latches that are spring loaded to extend the bolt. A latch actuator bar is situated to pivot about a longitudinal axis just above the spine and the latches. A lug is attached to the actuator bar that moves a paddle attached to the bolt when the actuator bar is rotated by a crank that extends axially from one end of the fence. The latches and actuator are arranged such that pulling the crank in a selected transverse direction dumps only the bale situated to dump in the opposite transverse direction.

Safety stays are provided, at least one independently situated to serve each cradle, having a box structure with a bore to receive the end of one of the base transverse beams, with a standing leg attached to reach upwardly to engage the underside of the cradle outboard longitudinal beams. The box is positioned by a slug welded on the base transverse beam and secured thereon by a hole in the beam just outboard of the positioned box with, preferably, the crown of a harness snap extending therethrough for easy removal.

A wheeled carrier is not part of this invention but is essential to its use for transport. Common farm lowboy tandem trailers have travel direction rails on each side. The base has adjustable longitudinal runners on each side. The runners are attached to the base transverse beams, preferably, with "U" bolts. Separation distance between the runners can be adjusted to fit inside the trailer rails. When the handler is mounted for transport on a vehicle the runners are normally clamped or bolted to some convenient structure on the vehicle for security.

BRIEF DESCRIPTION OF DRAWINGS

In the drawings wherein like features have like captions.

FIG. 5 is a side elevation of the latch actuator assembly.

DETAILED DESCRIPTION OF DRAWINGS

Figure 1:
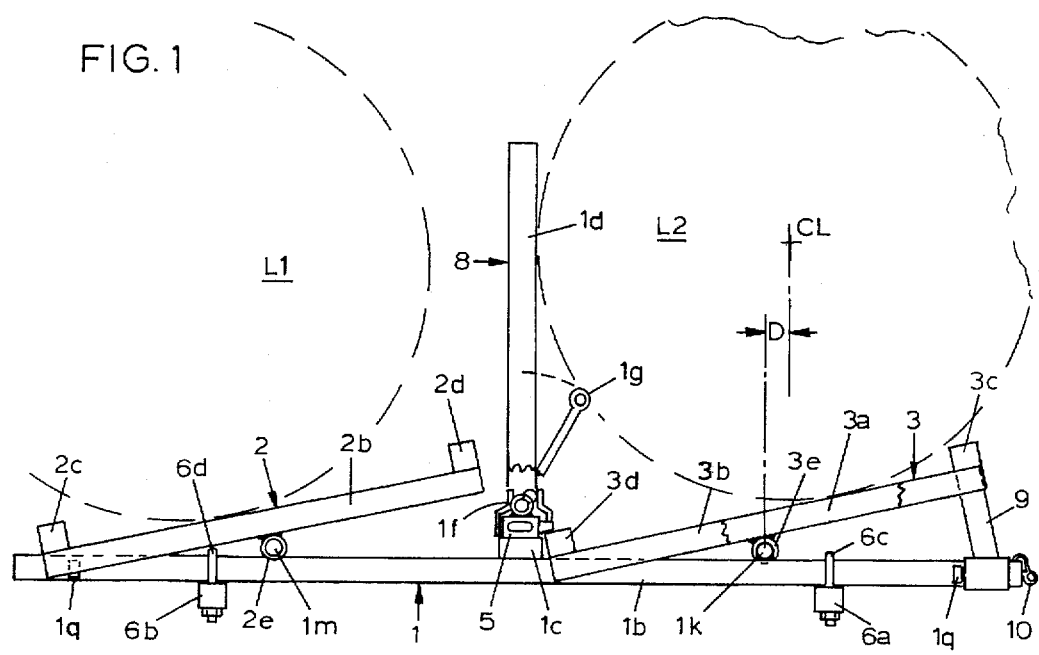
FIG. 1 is an end elevation viewed in the travel direction.

FIG. 1 shows an end view in the direction of intended travel with a round bale L2 in the transport position with cradle 3 latched and with releasable safety stay 9 in position. Cradle 2 is tripped to dump and bale L1 is moving leftward to roll over the cradle outboard beam 2c. Both cradles can tilt between these two positions. No vehicle is shown but, if used, would support the frame by way of the transverse beams.

Figure 2:
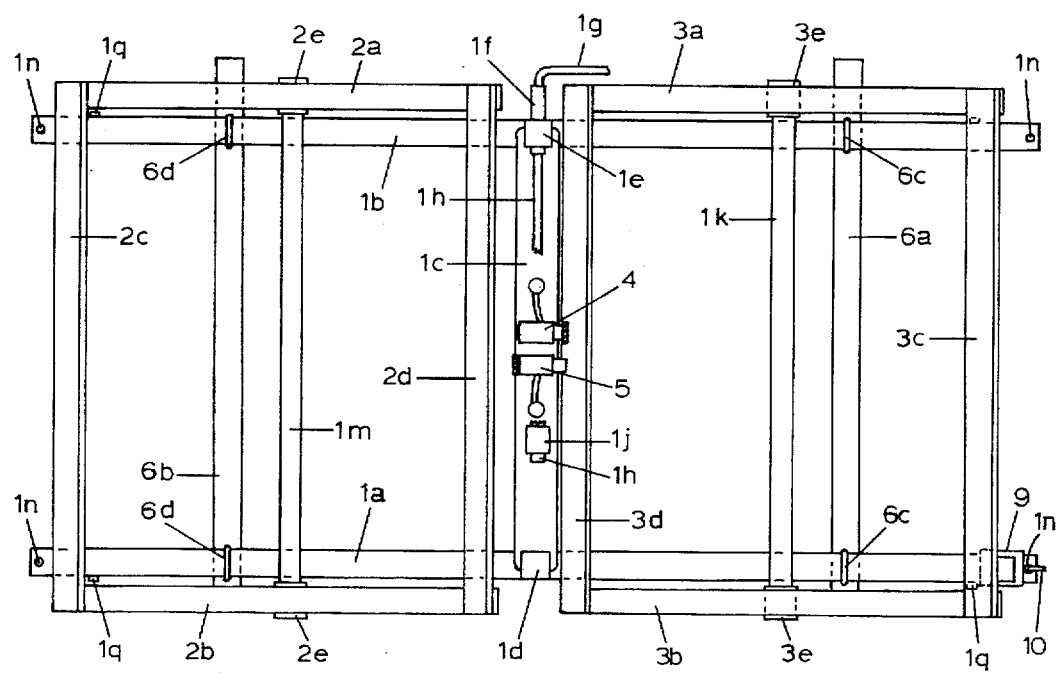
FIG. 2 is a top elevation with some parts cut away for clarity of description.
Figure 3:
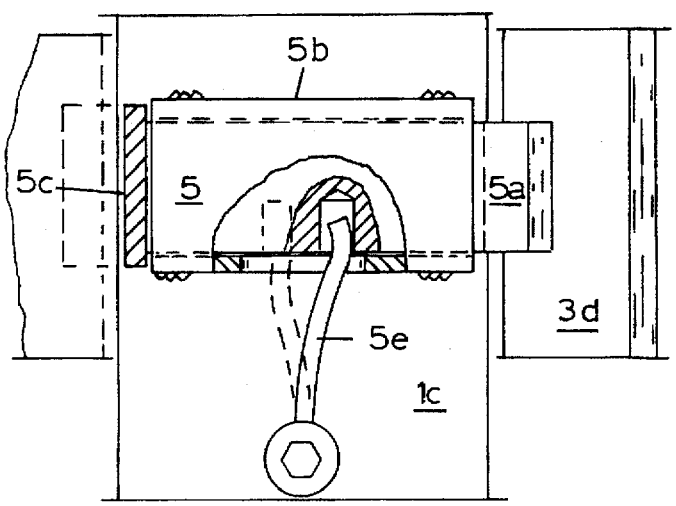
FIG. 3 is a top view of one latch, rather enlarged, and partially cut away.
Figure 4:
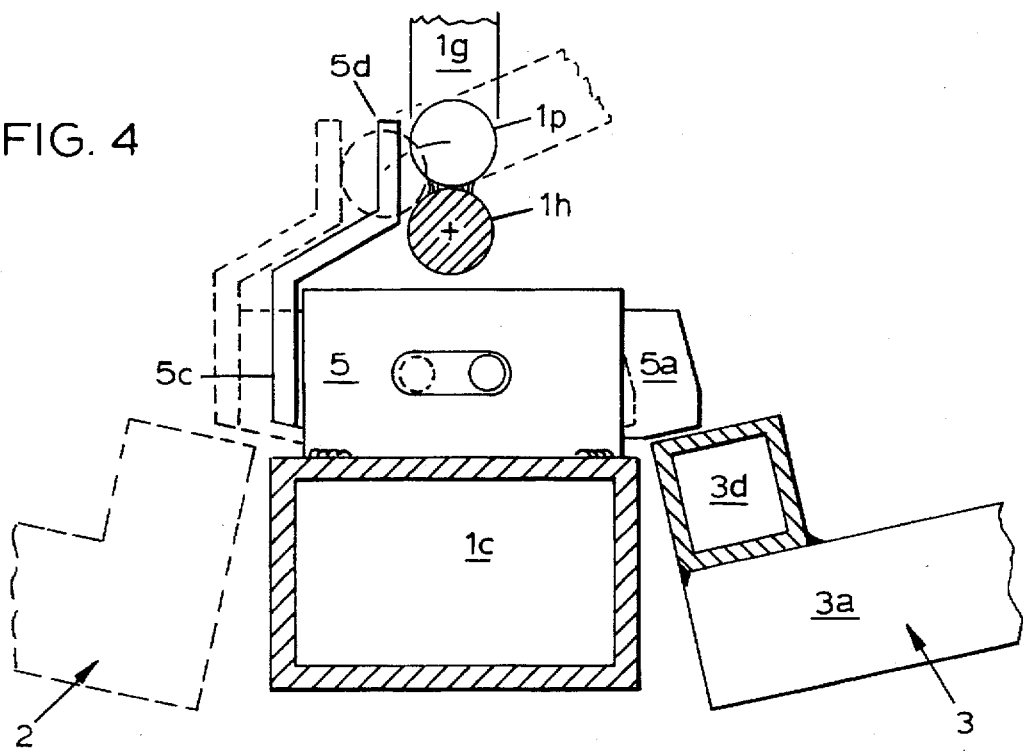
FIG. 4 is a side view of the latch of FIG. 3.

Post 1d has been cut away at the bottom to show the latches 4 and 5 which are welded to the spine. Beam 3b has been cut away in the vicinity of bar 1k to show the bar welded to the top of the base transverse beams and to show bearing tube 3e welded to the bottom of the tilt beams. Both cradles can tilt between these two positions. The base 1 has fence 8 to confine individual bales on the cradles. The base has a rectangular plan form as shown in FIG. 2 defined by transverse beams 1a and 1b separated by spine beam 1c which also carries latch 4 for cradle 2 and latch 5 for cradle 3. The fence is comprised of posts 1d and 1e standing from the transverse beams. The latches, more detailed in FIGS. 3, 4, and 5 are actuated by actuator rod 1h, which is partly cut away, bearingly supported in bearing 1j, extending through bearing tube 1f and bent to form crank 1g. Tube 1f penetrates and is welded to post 1e. When neutral, the crank extends vertically from bar 1h. By process yet to be described, movement of the crank in one direction dumps a bale in the opposite direction. The crank can release only one latch at a time.

Pivot bars 1m and 1k are pipes welded to the transverse beams separated from and parallel to the fence such that they are on the fence side, distance D, of a vertical plane CL containing the center of gravity of loaded round bales in the haul position. The cradles will tilt to the dump position by gravity force when the cradle is unlatched.

As shown in FIG. 2 the cradles have a rectangular plan form and comprise transverse tilt beams separated, slightly wider than the base, by longitudinal beams welded atop and at the ends of the tilt beams. The longitudinal beams limit the tilt of the cradles by engaging the top of the transverse beams. Cradle 2 is comprised of tilt beams 2a and 2b that have bearing tubes 2e welded to the bottom to pivot about bar 1m and are spaced apart by longitudinal beams 2c and 2d. Cradle 3 is similarly constructed of beams 3a and 3b separated by beams 3c and 3d, with bearing tubes 3e pivoting about bar 1k.

Runners 6a and 6b are laterally adjustable by loosening "U" bolts 6c and 6d. The runners extend forward to protect crank 1g from adjacent structures which may be additional similar hay handling devices loaded in longitudinal series on a transport platform.

Each transverse beam has a lug 1q welded to the side to position the square tube box end of safety stay 9 which is held in place, preferably, by a harness clip 10 with the crown through hole 1n. One hole is shown in the end of each transverse beam. Only one stay is shown in place, because cradle 2 has been released to dump. Four safety stays can be used. The safety stays 9 are made releasable by the act of removing them from the apparatus. The users commonly prefer to attach the stays by a short chain to the base where they swing about and clatter to attract attention before the transport device reaches highway speed. The drivers may not read or speak English but the noise produced by the uninstalled safety stays is a matter universally understood. The stays are made active by installing them on their respective transverse beam.

FIGS. 3 and 4 show latch 5 rather enlarged. Only one latch need be shown because they are identical and faced in opposite directions. The top view, FIG. 3, shows bolt 5a in slip 5b urged to the right to secure cradle beam 3d by spring 5e bolted to spine 1c. Paddle 5c is welded to the bolt and extends upward, bent to form anvil 5d. When latch pivot rod 1h is rotated lug 1p engages anvil 5d to move the paddle and latch bolt leftward to release cradle 3. Latch 4 is not shown but will face the opposite direction as shown in FIG. 5 and lug 1p cannot release both latches by the same action. By selective dimensioning, paddle 5c can be situated to move over beam 2d to make cradle 2 safe by the same action that dumps cradle 3. If a hay transport is fully loaded, the operator that dumps cradle 3 will normally pull a lanyard (not shown) attached to crank 1g from a position that would be in the rolling path of a bale if it were accidentally dumped from cradle 2 at that time.

FIG. 5 shows both latches 4 and 5 distributed near the center of spine 1c. This figure is enlarged less than FIGS. 4 and 5. This figure shows the gun springs 4e and 5e and bearing post 1j more clearly. Lug 1p is welded atop a straight portion of latch pivot bar 1h.

From the foregoing, it will be seen that this invention is one well adapted to attain all of the ends and objects hereinabove set forth, together with other advantages which are obvious and which are inherent to the tool.

It will be understood that certain features and sub-combinations are of utility and may be employed without reference to other features and sub-combinations. This is contemplated by and is within the scope of the claims.

As many possible embodiments may be made of the handler of this invention without departing from the scope thereof, it is to be understood that all matter herein set forth or shown in the accompanying drawings is to be interpreted as illustrative and not in a limiting sense.

I claim:

1. Hay handling apparatus for mounting on a vehicle laterally centered about the centerline of travel with a round bale, with its axis longitudinal, on each side of the centerline with ability to dump either bale over its respective vehicle side, the apparatus comprising:

a) a base with a rectangular plan form with a fore and aft transverse beam separated by a generally central longitudinal spine beam and a generally central vertical fence to separate said bales;

b) a bale cradle, of generally rectangular plan form, for supporting each said bale, hingedly attached to said base for tilting about a longitudinal axis, toward said fence to contain said bale and tiltable away from said fence to dump said bale;

c) independently releasable latch means at least one per said cradle, attached to said base, to secure said cradle when tilted toward said fence;

d) a releasable safety stay, at least one per said cradle, attached to said base, to secure said cradle when said cradle is tilted toward said fence, said safety stay to operate independently of said latch means.

2. The apparatus of claim 1 wherein said cradle is hingedly attached by a pivot bar, laterally spaced from said spine beam, extending longitudinally between said transverse beams, carrying bearings attached to said cradle.

3. The apparatus of claim 1 wherein said latch means comprises a latch body, with a movable latch bolt carried therein, attached to said spine beam to retractably extend to engage said cradle when tilted toward said fence to secure said cradle in a tilt position.

4. The apparatus of claim 1 wherein longitudinal runners are attached to the underside of said base, laterally spaced apart and each generally equidistant from each side of said spine beam to add lateral stability to said apparatus when mounted on a vehicle.

5. The apparatus of claim 1 wherein a latch actuating rocker bar is attached to said base generally centered above said spine beam with means to actuate said latch means when rotated with a crank extending vertically from said rocker bar such that moving said crank in one lateral direction releases one of said latch means to dump a bale in a direction opposite said lateral direction.

6. The apparatus of claim 1 wherein longitudinal runners are attached to the underside of said base, laterally spaced apart, generally symmetrical relative to said spine beam to add lateral stability to said apparatus when mounted on a vehicle.

7. The apparatus of claim 1 wherein said releasable safety stay each comprises, at least in part, a rectangular tubular portion to be telescopingly received on an end of said transverse beam, with an extension arranged to engage said longitudinal beam on the cradle to be served by said stay such that said cradle cannot be tilted away from said fence, said stay to be released by it's removal from said transverse beam.

8. Hay handling apparatus for mounting on a vehicle laterally centered about the centerline of travel with a round bale, with its axis longitudinal, situated in a cradle on each side of the centerline with ability to dump either bale over its respective vehicle side, the apparatus comprising:
   a) a base with a rectangular plan form with a fore and aft transverse beam separated by and welded to a generally central longitudinal spine beam and a generally central vertical fence comprising at least two posts welded to and extending vertically from said spine to separate said bales, with a longitudinal pivot bar for each said cradle extending parallel to and some distance from said spine and welded atop said transverse beams;
   b) said bale cradle, of generally rectangular plan form, for supporting each said bale, comprising two transverse tilt beams, each having an inboard end and an outboard end, separated by and welded at the inboard and outboard ends to longitudinal beams, one inboard beam near said spine and one outboard beam at the outboard end, each said tilt beam having a bearing tube welded to the tilt beam lower side to be carried by said pivot bar for tilting said cradle toward said fence to contain said bale and for tilting away from said fence to dump said bale;
   c) independently releasable latch means, at least one per said cradle, attached to said base, to secure said cradle when said cradle is tilted toward said fence;
   d) a releasable safety stay, at least one per said cradle, attached to said base, to secure said cradle when said cradle is tilted toward said fence, said safety stay to operate independently of said latch means.

9. The apparatus of claim 8 wherein all said beams are tubular of rectangular cross section.

10. The apparatus of claim 8 wherein the amount of tilt of said cradle is limited by contact between said longitudinal beams and said transverse beams.

11. The apparatus of claim 8 wherein said latch means comprises a latch body, with a movable latch bolt carried therein, attached to said spine beam to retractably extend said bolt to engage said cradle when tilted toward said fence to secure said cradle in a tilt position.

12. The apparatus of claim 8 wherein longitudinal runners are attached to the underside of said base, laterally spaced apart and one generally equidistant from each side of said spine beam to add lateral stability to said apparatus when mounted on a vehicle.

13. The apparatus of claim 8 wherein said releasable safety stay each comprises, at least in part, a rectangular tubular portion to be telescopingly received on an end of said transverse beam, with an extension arranged to engage said longitudinal beam on the cradle to be served by said stay such that said cradle cannot be tilted away from said fence, said stay to be released by it's removal from said transverse beam.

* * * * *